(12) United States Patent
Scheel

(10) Patent No.: US 10,050,522 B2
(45) Date of Patent: Aug. 14, 2018

(54) INTERLEAVED DUAL OUTPUT CHARGE PUMP

(71) Applicant: SKYWORKS SOLUTIONS, INC., Woburn, MA (US)

(72) Inventor: Michael Lee Scheel, San Jose, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 14/861,058

(22) Filed: Sep. 22, 2015

(65) Prior Publication Data

US 2016/0241142 A1 Aug. 18, 2016

Related U.S. Application Data

(60) Provisional application No. 62/116,457, filed on Feb. 15, 2015.

(51) Int. Cl.
*H02M 3/07* (2006.01)
*H02M 1/40* (2007.01)
*H02M 3/18* (2006.01)
*G05F 1/10* (2006.01)
*H02M 1/00* (2006.01)

(52) U.S. Cl.
CPC ...... *H02M 3/073* (2013.01); *H02M 2001/009* (2013.01); *H02M 2003/072* (2013.01); *H02M 2003/076* (2013.01)

(58) Field of Classification Search
CPC .... H02M 3/07; H02M 2003/072; H02M 3/18; H02M 3/337; G05F 1/10; G05F 3/02; G05F 3/08; G05F 3/16; G05F 1/00
See application file for complete search history.

(56) References Cited

U.S. PATENT DOCUMENTS 5,532,916 A * 7/1996 Tamagawa ............... H02M 3/07
307/110
6,605,985 B2 * 8/2003 Pagliato ................. H02M 3/073
327/536

(Continued)

FOREIGN PATENT DOCUMENTS

| CN | 102484423 A | 5/2012 |
| CN | 103999227 A | 8/2014 |

(Continued)

*Primary Examiner* — Pablo Tran
(74) *Attorney, Agent, or Firm* — Chang & Hale LLP

(57) ABSTRACT

According to some implementation, a charge pump includes a boost charge pump circuit and a buck charge pump circuit sharing a common flying capacitance. In some implementations, the boost pump circuit includes an input node and a boosted-voltage output node, and the buck charge pump circuit includes the input node and a divided-voltage output node. In some implementations, the charge pump of claim 3 wherein the boosted-voltage includes 2×Vin, and the divided-voltage includes Vin/2, Vin being an input voltage at the input node. In some implementations, the boost pump circuit further includes a first holding capacitance that couples the boosted-voltage output node to a ground. In some implementations, the buck pump circuit further includes a second holding capacitance that couples the divided-voltage output node to the ground.

20 Claims, 17 Drawing Sheets

(56) References Cited

U.S. PATENT DOCUMENTS

| | | | | |
|---|---|---|---|---|
| 6,812,776 B2* | 11/2004 | Henry | ............... | H02M 3/07 327/535 |
| 7,282,985 B2* | 10/2007 | Yen | ............... | H02M 3/07 307/110 |
| 7,430,133 B1* | 9/2008 | McIntyre | ............... | H02M 3/07 307/109 |
| 7,602,232 B2* | 10/2009 | Georgescu | ............... | H02M 3/07 327/536 |
| 7,851,946 B2* | 12/2010 | Oyama | ............... | H02M 3/07 307/109 |
| 7,923,865 B2* | 4/2011 | Melse | ............... | G11C 5/145 307/82 |
| 8,159,091 B2* | 4/2012 | Yeates | ............... | H02M 3/07 307/110 |
| 8,427,851 B2* | 4/2013 | Lesso | ............... | H02M 3/07 323/267 |
| 8,841,891 B2* | 9/2014 | Williams | ............... | G05F 3/16 323/265 |
| 2009/0326624 A1* | 12/2009 | Melse | ............... | A61N 1/378 607/116 |
| 2012/0112724 A1 | 5/2012 | Nishida | | |
| 2012/0326771 A1* | 12/2012 | MacFarlane | ............... | H02M 3/07 327/536 |
| 2013/0234785 A1* | 9/2013 | Dai | ............... | H02M 3/07 327/536 |
| 2015/0015340 A1 | 1/2015 | Liu et al. | | |

FOREIGN PATENT DOCUMENTS

| | | |
|---|---|---|
| CN | 201510633447.7 | 9/2015 |
| DE | 102015218359.9 | 9/2015 |
| JP | 2015-189626 | 9/2015 |
| KR | 10-2015-0136361 | 9/2015 |
| TW | 104132270 | 9/2015 |
| WO | 2013070971 A2 | 5/2013 |

* cited by examiner

| PHASE | CYCLE I | | | | CYCLE II | | | |
|---|---|---|---|---|---|---|---|---|
| | $\Phi_1$ | $\Phi_2$ | $\Phi_3$ | $\Phi_4$ | $\Phi_1$ | $\Phi_2$ | $\Phi_3$ | $\Phi_4$ |
| CHARGE @ NODE 104 | $V_{in}$ | $V_{in}/2$ | $V_{in}$ | $2\times V_{in}$ | $V_{in}$ | $V_{in}/2$ | $V_{in}$ | $2\times V_{in}$ |
| CHARGE @ NODE 106 | $V_{in}/2$ | GND | GND | $V_{in}$ | $V_{in}/2$ | GND | GND | $V_{in}$ |
| Q | $\frac{1}{2}CV_{in}$ | $\frac{1}{2}CV_{in}$ | $CV_{in}$ | $CV_{in}$ | $\frac{1}{2}CV_{in}$ | $\frac{1}{2}CV_{in}$ | $CV_{in}$ | $CV_{in}$ |

FIG.6

| PHASE | CYCLE I | | | | CYCLE II | | | |
|---|---|---|---|---|---|---|---|---|
| | $\Phi_1$ | $\Phi_2$ | $\Phi_3$ | $\Phi_4$ | $\Phi_1$ | $\Phi_2$ | $\Phi_3$ | $\Phi_4$ |
| CHARGE @ NODE 104 | $V_{in}$ | $V_{in}/2$ | $V_{in}$ | $2\times V_{in}$ | $V_{in}$ | $V_{in}/2$ | $V_{in}$ | $2\times V_{in}$ |
| CHARGE @ NODE 106 | $V_{in}/2$ | GND | $V_{in}/2$ | $V_{in}$ | $V_{in}/2$ | GND | $V_{in}/2$ | $V_{in}$ |
| Q | $\frac{1}{2}CV_{in}$ | $\frac{1}{2}CV_{in}$ | $\frac{1}{2}CV_{in}$ | $CV_{in}$ | $\frac{1}{2}CV_{in}$ | $\frac{1}{2}CV_{in}$ | $\frac{1}{2}CV_{in}$ | $CV_{in}$ |

INTERLEAVED DUAL OUTPUT CHARGE PUMP

CROSS-REFERENCE TO RELATED APPLICATION(S)

This application claims priority to U.S. Provisional Application No. 62/116,457 filed Feb. 15, 2015, entitled INTERLEAVED DUAL OUTPUT CHARGE PUMP, the disclosure of which is hereby expressly incorporated by reference herein in its entirety.

This application is related to U.S. Provisional Application No. 62/116,458 filed Feb. 15, 2015, entitled DEVICES AND METHODS RELATED TO MULTI-MODE POWER MANAGEMENT, the disclosure of which is hereby expressly incorporated by reference herein in its entirety.

BACKGROUND

Field

The present disclosure relates to voltage supply systems in radio-frequency (RF) applications.

Description of the Related Art

Many circuits in portable devices such as wireless devices require or utilize DC/DC power conversion to efficiently utilize limited battery supply resources. Often, voltages that exceed a battery voltage are needed or desired, while in other situations, voltages that are significantly less than the battery voltage are utilized.

Traditionally, parallel supply circuitry can be utilized to deliver a plurality of power supply outputs. However, such parallel supply circuits typically result in increased die area, increased input/output (I/O) complexity, and/or increased bill of materials (BOM) cost. Charge pump designs can be utilized to deliver a boost and a buck output voltage. Traditionally, separate circuits are utilized in such designs, with each circuit having its own passive components resulting in duplication of I/O and BOM content.

SUMMARY

In accordance with a number of implementations, the present disclosure relates to a charge pump including a boost charge pump circuit and a buck charge pump circuit sharing a common flying capacitance.

In some implementations, the boost pump circuit includes an input node and a boosted-voltage output node. In some implementations, the buck charge pump circuit includes the input node and a divided-voltage output node.

In some implementations, the boosted-voltage includes 2×Vin, and the divided-voltage includes Vin/2, Vin being an input voltage at the input node.

In some implementations, the boost pump circuit further includes a first holding capacitance that couples the boosted-voltage output node to a ground. In some implementations, the buck pump circuit further includes a second holding capacitance that couples the divided-voltage output node to the ground.

In some implementations, the boost pump circuit and the buck pump circuit further include a first switch (S1) and a second switch (S2) arranged in parallel between the input node and respective ends of the flying capacitance, a third switch (S3) between the second end of the flying capacitance and the ground, a fourth switch (S4) between the first end of the flying capacitance and the boosted-voltage output node, a fifth switch (S5) between the first end of the flying capacitance and the divided-voltage output node, and a sixth switch (S6) second end of the flying capacitance and the divided-voltage output node.

In some implementations, the switches S1, S2, S3, S4, S5 and S6 are configured to operate in four phases to yield the 2×Vin output and the Vin/2 output.

In some implementations, the first phase includes closed S1 and S6 and open S2 to S5, the second phase includes closed S3 and S5 and open S1, S2, S4 and S6, the third phase includes closed S1 and S3 and open S2 and S4 to S6, and the fourth phase includes closed S2 and S4 and open S1, S3, S5 and S6.

In some implementations, the first phase includes closed S1 and S6 and open S2 to S5, the second phase includes closed S3 and S5 and open S1, S2, S4 and S6, the third phase includes closed S1 and S6 and open S2 to S5, and the fourth phase includes closed S2 and S4 and open S1, S3, S5 and S6. In some implementations, the third phase includes partial charging of the flying capacitance to improve charge preservation.

In some implementations, the first phase includes closed S1 and S6 and open S2 to S5, the second phase includes closed S3 and S5 and open S1, S2, S4 and S6, the third phase includes closed S1 and S6 and open S2 to S5, and the fourth phase includes closed S3 and S5 and open S1, S2, S4 and S6. In some implementations, the fourth phase includes truncated charging of the flying capacitance to limit ripple effect in hysteretic feedback loop.

In some implementations, the present disclosure relates a voltage supply system that includes a boost converter configured to generate a boosted voltage based on a battery voltage. The voltage supply system also includes a charge pump having a boost charge pump circuit and a buck charge pump circuit sharing a common flying capacitance, the charge pump configured to generate output voltages having magnitudes 2×Vbatt and Vbatt/2.

In some implementations, the boost pump circuit includes an input node and a boosted-voltage output node. In some implementations, the buck charge pump circuit includes the input node and a divided-voltage output node.

In some implementations, the boost pump circuit further includes a first holding capacitance that couples the boosted-voltage output node to a ground. In some implementations, the buck pump circuit further includes a second holding capacitance that couples the divided-voltage output node to the ground.

In some implementations, the boost pump circuit and the buck pump circuit further include a first switch (S1) and a second switch (S2) arranged in parallel between the input node and respective ends of the flying capacitance, a third switch (S3) between the second end of the flying capacitance and the ground, a fourth switch (S4) between the first end of the flying capacitance and the boosted-voltage output node, a fifth switch (S5) between the first end of the flying capacitance and the divided-voltage output node, and a sixth switch (S6) second end of the flying capacitance and the divided-voltage output node.

In some implementations, the switches S1, S2, S3, S4, S5 and S6 are configured to operate in four phases to yield the 2×Vbatt output and the Vbatt/2 output.

In some implementations, the present disclosure relates to a radio-frequency (RF) module that includes a packaging substrate configured to receive a plurality of components. The RF module further includes a power amplification system implemented on the packaging substrate, the power amplification system including a voltage supply system, the voltage supply system including a charge pump having a boost charge pump circuit and a buck charge pump circuit sharing a common flying capacitance, the charge pump configured to generate output voltages having magnitudes 2×Vbatt and Vbatt/2, the quantity Vbatt being a battery voltage.

In some implementations, the boost pump circuit includes an input node and a boosted-voltage output node. In some implementations, the buck charge pump circuit includes the input node and a divided-voltage output node.

In some implementations, the boost pump circuit further includes a first holding capacitance that couples the boosted-voltage output node to a ground. In some implementations, the buck pump circuit further includes a second holding capacitance that couples the divided-voltage output node to the ground.

In some implementations, the boost pump circuit and the buck pump circuit further include a first switch (S1) and a second switch (S2) arranged in parallel between the input node and respective ends of the flying capacitance, a third switch (S3) between the second end of the flying capacitance and the ground, a fourth switch (S4) between the first end of the flying capacitance and the boosted-voltage output node, a fifth switch (S5) between the first end of the flying capacitance and the divided-voltage output node, and a sixth switch (S6) second end of the flying capacitance and the divided-voltage output node.

In some implementations, the switches S1, S2, S3, S4, S5 and S6 are configured to operate in four phases to yield the 2×Vbatt output and the Vbatt/2 output.

According to some teachings, the present disclosure relates to a radio-frequency (RF) device that includes a transceiver generate to a radio-frequency (RF) signal. The RF device includes a front-end module (FEM) in communication with the transceiver, the FEM including a power amplification system configured to amplify the RF signal, the power amplification system including a voltage supply system, the voltage supply system including a charge pump having a boost charge pump circuit and a buck charge pump circuit sharing a common flying capacitance, the charge pump configured to generate output voltages having magnitudes 2×Vbatt and Vbatt/2, the quantity Vbatt being a battery voltage. The RF device further includes an antenna in communication with the FEM, the antenna configured to transmit the amplified RF signal.

In some implementations, the RF device includes a wireless device. In some implementations, the wireless device is a cellular phone.

In some implementations, the boost pump circuit includes an input node and a boosted-voltage output node. In some implementations, the buck charge pump circuit includes the input node and a divided-voltage output node.

In some implementations, the boost pump circuit further includes a first holding capacitance that couples the boosted-voltage output node to a ground. In some implementations, the buck pump circuit further includes a second holding capacitance that couples the divided-voltage output node to the ground.

In some implementations, the boost pump circuit and the buck pump circuit further include a first switch (S1) and a second switch (S2) arranged in parallel between the input node and respective ends of the flying capacitance, a third switch (S3) between the second end of the flying capacitance and the ground, a fourth switch (S4) between the first end of the flying capacitance and the boosted-voltage output node, a fifth switch (S5) between the first end of the flying capacitance and the divided-voltage output node, and a sixth switch (S6) second end of the flying capacitance and the divided-voltage output node.

In some implementations, the switches S1, S2, S3, S4, S5 and S6 are configured to operate in four phases to yield the 2×Vbatt output and the Vbatt/2 output.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIG. 6 shows charge levels in the flying capacitor of the dual output charge pump circuit in FIG. 4 over two cycles of the four phases of operation according to some implementations.

FIG. 7 shows a reduction in charge loss levels in the flying capacitor of the dual output charge pump circuit in FIG. 4 over two cycles of the four phases of operation according to some implementations.

Figure 1:
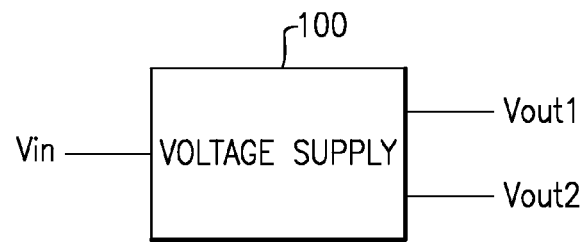
FIG. 1 is a block diagram of a voltage supply system according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION OF SOME IMPLEMENTATIONS

The headings provided herein, if any, are for convenience only and do not necessarily affect the scope or meaning of the claimed invention.

FIG. 1 shows a block diagram of a voltage supply system 100 having one or more features as described herein. Such a system can generate a plurality of output voltages (e.g., Vout1 and Vout2) based on an input voltage (Vin).

Figure 2:
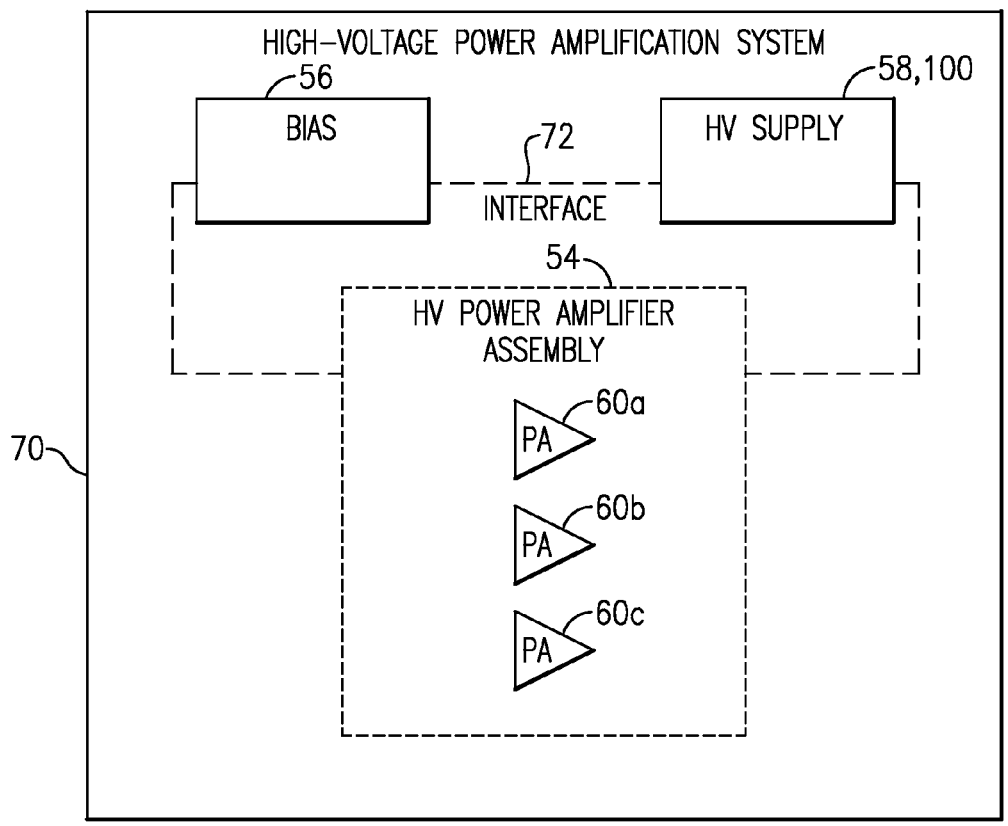
FIG. 2 shows an example application of the voltage supply system in FIG. 1 according to some implementations.

FIG. 2 shows an example application in which the voltage supply system 100 of FIG. 1 can be implemented. In the example of FIG. 2, such a voltage system can include a high-voltage (HV) supply system 58 (also referred to herein as 100) configured to provide a plurality of supply voltage signals for an HV power amplification system 70. Examples related to such an HV supply system are described in 62/116,458 filed Feb. 15, 2015, entitled DEVICES AND METHODS RELATED TO MULTI-MODE POWER MANAGEMENT, the disclosure of which is hereby expressly incorporated by reference herein in its entirety. Although the voltage supply system (100 in FIG. 1) is described herein in such a context, it will be understood that one or more features of such a voltage supply system can also be utilized in other applications.

In the example of FIG. 2, the HV power amplification system 70 can include a power amplifier assembly 54 having one or more power amplifiers (PAs) (e.g., 60a-60c). Some or all of such PAs can be configured to operate in an HV mode.

Referring to FIG. 2, the HV power amplification system 70 can further include a bias system 56. Such a system can be configured to provide bias signals to the power amplifier assembly 54 for operation of the PA(s).

Also referring to FIG. 2, the HV power amplification system 70 can further include an interface 72 between the power amplifier assembly 54 and either or both of the bias system 56 and the HV supply system 100. In some embodiments, such an interface can also provide interfacing functionality between the HV power amplification system 70 and an external system (not shown).

Many circuits in portable devices such as wireless devices require or utilize DC/DC power conversion to efficiently utilize limited battery supply resources. Often, voltages that exceed a battery voltage are needed or desired, while in other situations, voltages that are significantly less than the battery voltage are utilized.

Traditionally, parallel supply circuitry can be utilized to deliver a plurality of power supply outputs. However, such parallel supply circuits typically result in increased die area, increased input/output (I/O) complexity, and/or increased bill of materials (BOM) cost.

Described herein are examples related to a supply system that, among others, includes a combination of a boost charge pump and a buck charge pump, to provide a plurality of outputs (e.g., dual output). In some embodiments, such a combination can be configured to share a substantial portion of a common circuit, thereby reducing, for example, I/O complexity and BOM cost.

In the context of a dual output system, it is noted that dual output voltages such as a boosted output voltage and a buck output voltage, the current loading of the boost is often significantly less than that of the buck. Charge pump designs can be utilized to deliver a boost and a buck output voltage. Traditionally, separate circuits are utilized in such designs, with each circuit having its own passive components resulting in duplication of I/O and BOM content.

Figure 3A:
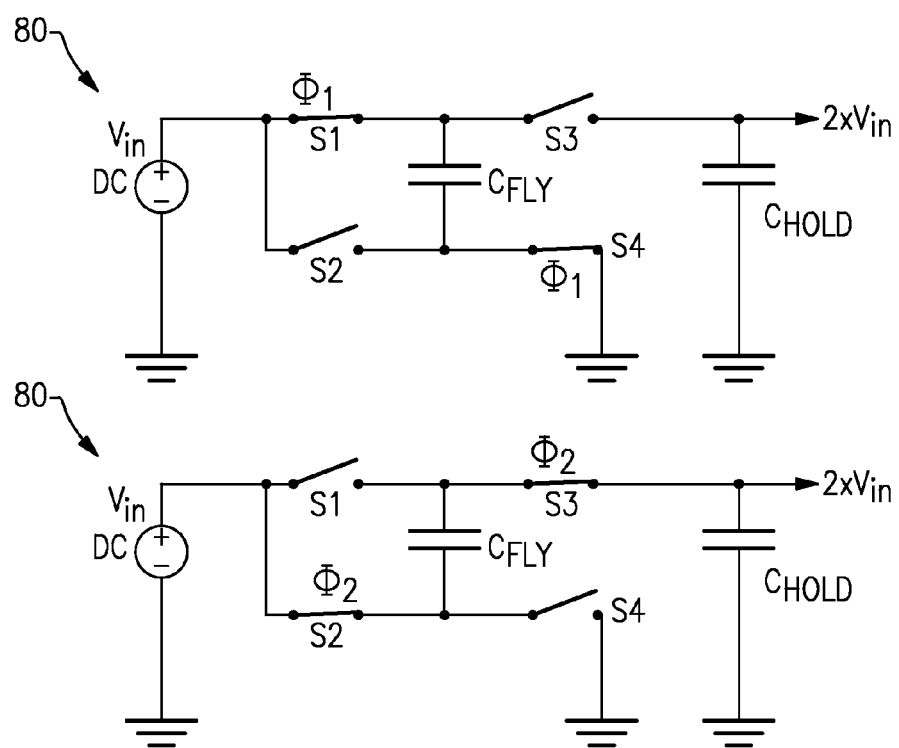
FIG. 3A shows schematic diagrams of a charge pump doubler circuit according to some implementations.
Figure 3B:
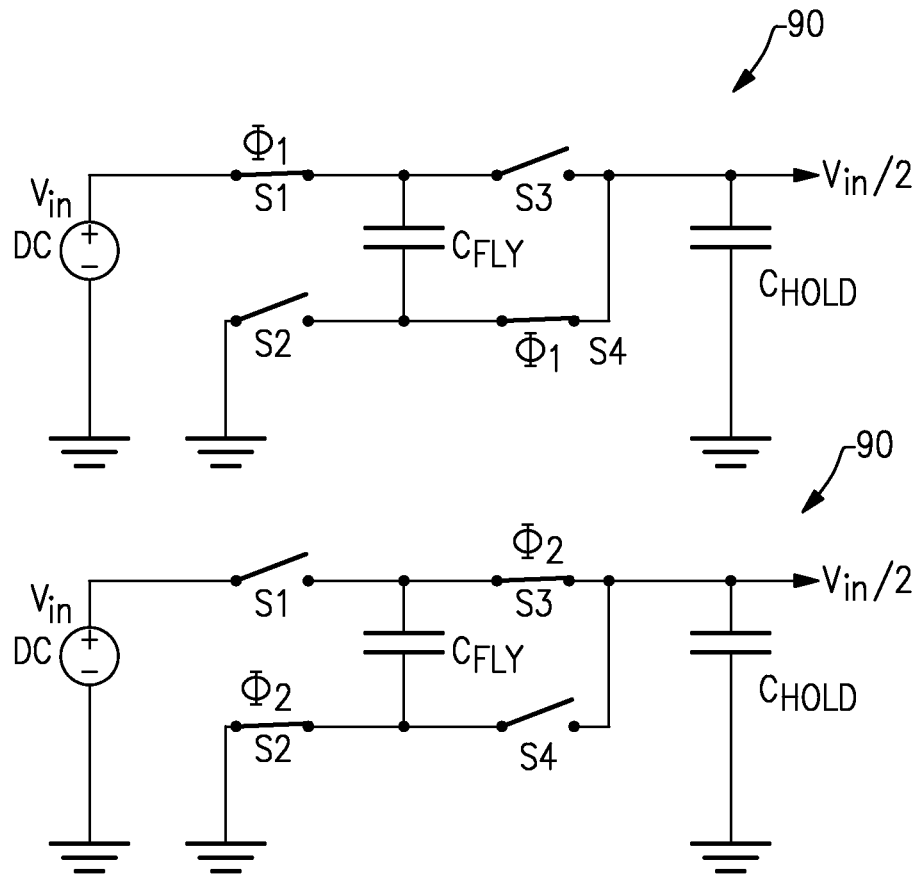
FIG. 3B shows schematic diagrams of a charge pump divider circuit according to some implementations.

FIGS. 3A and 3B show examples of two such separate circuits configured to provide dual output voltages. Such dual output voltages are depicted as being twice an input voltage, or $2 \times V_{in}$, for a charge pump doubler circuit (FIG. 3A) and half of the input voltage, or $V_{in}/2$, for a charge pump divider circuit (FIG. 3B). The input voltage $V_{in}$ can be, for example, a battery voltage ($V_{batt}$). Although described in such doubling and halving examples, it will be understood that other voltages relative to the input can be obtained.

In the example of FIG. 3A, the charge pump doubler circuit can be operated in two phases to generate an output ($2 \times V_{in}$) that is approximately twice the input voltage $V_{in}$. In the first phase denoted by $\Phi_1$ at closed switches S1 and S4, a flying capacitor ($C_{Fly}$) is charged to approximately $V_{in}$ by a switching configuration listed in the $\Phi_1$ portion of Table 1A. During that time, a holding capacitor ($C_{Hold}$), which was charged during the last cycle, discharges to provide the output. In the second phase denoted by $\Phi_2$ at closed switches S2 and S3, the holding capacitor ($C_{Hold}$) is charged while the output of approximately $2 \times V_{in}$ is provided, by a switching configuration listed in the $\Phi_2$ portion of Table 1A, in which the charged flying capacitor ($C_{Fly}$) is placed in series with the input voltage $V_{in}$.

TABLE 1A

| Phase | S1 | S2 | S3 | S4 |
| --- | --- | --- | --- | --- |
| $\Phi_1$ | Closed | Open | Open | Closed |
| $\Phi_2$ | Open | Closed | Closed | Open |

In the example of FIG. 3B, the charge pump divider circuit can be operated in two phases to generate an output ($V_{in}/2$) that is approximately half the input voltage $V_{in}$. In the first phase denoted by at closed switches S1 and S4, a flying capacitor ($C_{Fly}$) and a holding capacitor ($C_{Hold}$) are shown to be placed in series between the input voltage $V_{in}$ and ground. When S1 and S4 are closed, $C_{Fly}$ is substantially uncharged, and $C_{Hold}$ is previously charged to yield across it a voltage of $V_{in}/2$. Assuming that capacitance values of $C_{Fly}$ and $C_{Hold}$ are similar, $C_{Hold}$ will charge to yield across it a voltage of $V_{in}/2$. Accordingly, the output node is shown to have a voltage of $V_{in}/2$. Table 1B lists a switching configuration for the foregoing first phase $\Phi_1$. In the second phase denoted by $\Phi_2$ at closed switches S2 and S3, $C_{Fly}$ (now charged to $V_{in}/2$) and $C_{Hold}$ are now electrically parallel between the output node and the ground, and the input voltage $V_{in}$ is disconnected. Accordingly, the output voltage can be maintained at approximately $V_{in}/2$ as either or both of $C_{Fly}$ and $C_{Hold}$ discharge through the output node. Table 1B lists a switching configuration for the foregoing second phase $\Phi_2$.

TABLE 1B

| Phase | S1 | S2 | S3 | S4 |
| --- | --- | --- | --- | --- |
| $\Phi_1$ | Closed | Open | Open | Closed |
| $\Phi_2$ | Open | Closed | Closed | Open |

In the example of FIGS. 3A and 3B, there are two separate circuits for the foregoing voltage-doubling and voltage-halving functionalities. Accordingly, the two circuits typically utilize two separate flying capacitors ($C_{Fly}$) and two separate capacitors ($C_{Hold}$). Further, each circuit includes four switches; thus, there are a total of eight switches among the two circuits.

Figure 4:
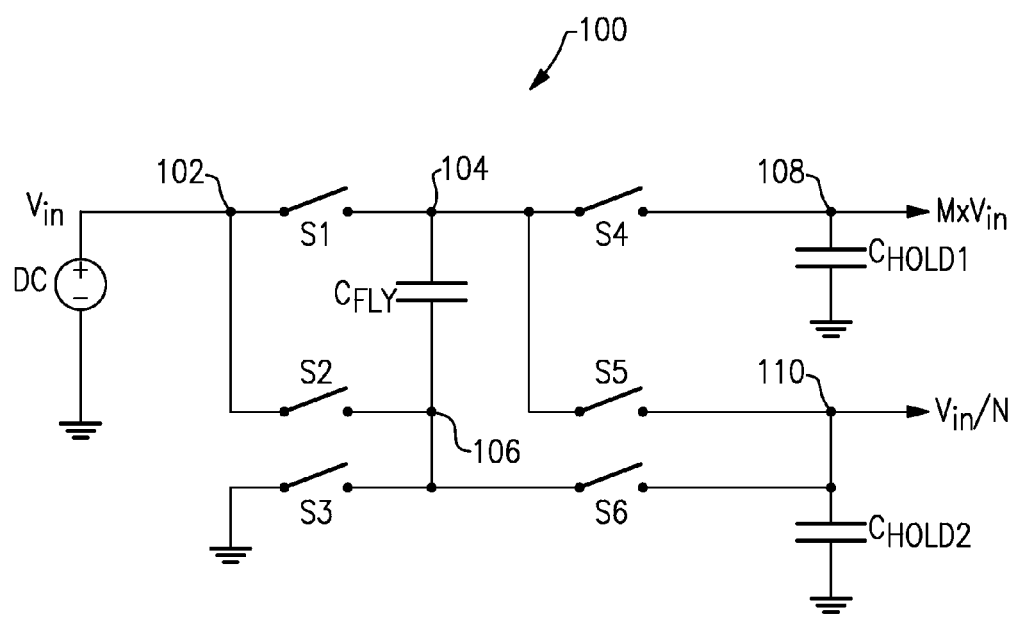
FIG. 4 is a schematic diagram a dual output charge pump circuit according to some implementations.

In some embodiments, functionalities associated with the foregoing separate circuits can be provided by a single circuit. FIG. 4 shows an example of a charge pump circuit 100 that can be configured and operated to provide both of the voltage-doubling and voltage-halving functionalities. Again, although various examples are described in the context of doubling and halving, it will be understood that voltage-increasing and voltage-decreasing factors can be other than 2.

Referring to FIG. 4, the charge pump circuit 100 can be configured to receive an input voltage $V_{in}$ (e.g., a battery voltage $V_{batt}$) and generate a doubled-voltage output ($2 \times V_{in}$) and a halved-voltage output ($V_{in}/2$). More particularly, the input voltage $V_{in}$ is shown to be provided to an input node 102 that is coupled to a node 104 through a first switch S1. A second switch S2 is shown to couple the input node 102 to a node 106 through a second switch S2. The nodes 104 and 106 are shown to be coupled by a flying capacitor ($C_{Fly}$). The node 106 is shown to be coupled to ground through a third switch S3.

Still referring to FIG. 4, the node 104 is shown to be coupled to a first output node 108 through a fourth switch S4, and to a second output node 110 through a fifth switch S5. The node 106 is shown to be coupled to the second output node 110 through a sixth switch S6. The first output node 108 is shown to be coupled to ground by a first holding capacitor ($C_{Hold1}$), and the second output node 110 is shown to be coupled to ground by a second holding capacitor ($C_{Hold2}$).

In some embodiments, the charge pump circuit 100 of FIG. 4 can be operated in four phases ($\Phi_1$, $\Phi_2$, $\Phi_3$, $\Phi_4$) to generate both doubled-voltage ($2 \times V_{in}$) and halved-voltage ($V_{in}/2$) outputs based on an input voltage $V_{in}$. FIGS. 5A-5D show examples of such four phases, and Table 2 lists switch configurations for each of the four phases.

TABLE 2

| Phase | S1 | S2 | S3 | S4 | S5 | S6 |
| --- | --- | --- | --- | --- | --- | --- |
| $\Phi_1$ | Closed | Open | Open | Open | Open | Closed |
| $\Phi_2$ | Open | Open | Closed | Open | Closed | Open |
| $\Phi_3$ | Closed | Open | Closed | Open | Open | Open |
| $\Phi_4$ | Open | Closed | Open | Closed | Open | Open |

Figure 5A:
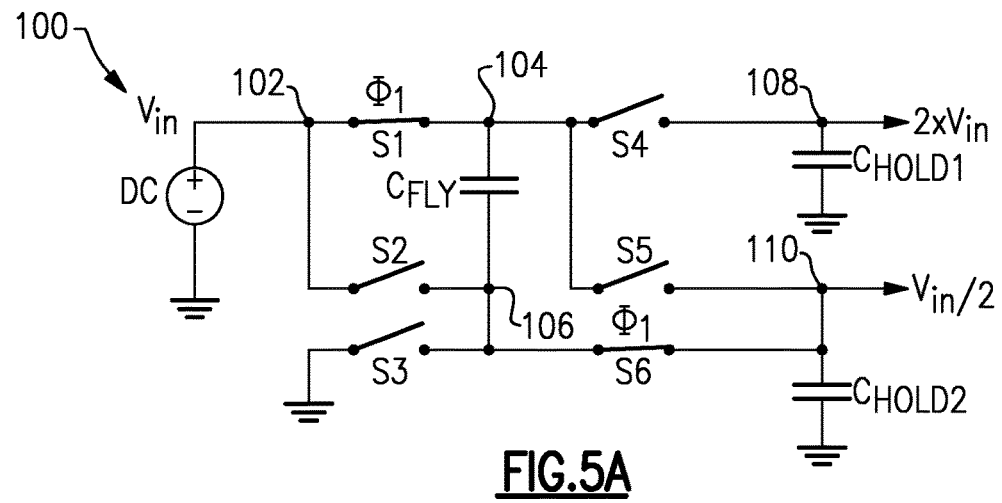
FIGS. 5A-5D show a sequence of four phases of operation of the dual output charge pump circuit in FIG. 4 according to some implementations.

In the first phase ($\Phi_1$) example of FIG. 5A, the closed switches S1 and S6 are indicated by $\Phi_1$, and the remaining switches are in open states. Such coupling of the input node (102 in FIG. 4) to the second output node (110) (for $V_{in}/2$) through S1, $C_{Fly}$, and S6 can result in a configuration similar to the first phase of the example of FIG. 3B (in which the input is coupled to the $V_{in}/2$ output through S1, $C_{Fly}$ and S4).

Figure 5B:
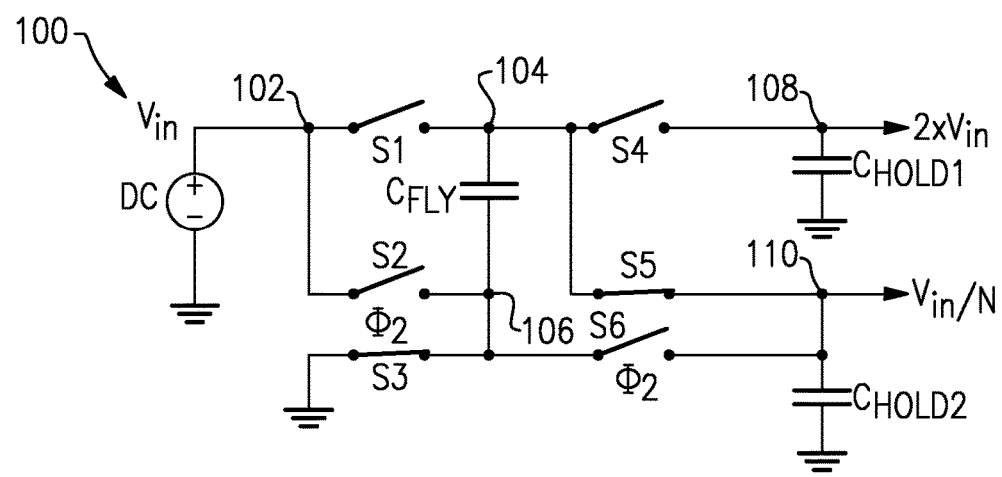

In the second phase ($\Phi_2$) example of FIG. 5B, the closed switches S3 and S5 are indicated by $\Phi_2$, and the remaining switches are in open states. Such an arrangement of $C_{Fly}$ and $C_{Hold2}$ with respect to ground and the second output node (110) (for $V_{in}/2$) through S3 and S5 can result in a configuration similar to the second phase of the example of FIG. 3B (in which $C_{Fly}$ and $C_{Hold2}$ are arranged similarly through S2 and S3).

Figure 5C:
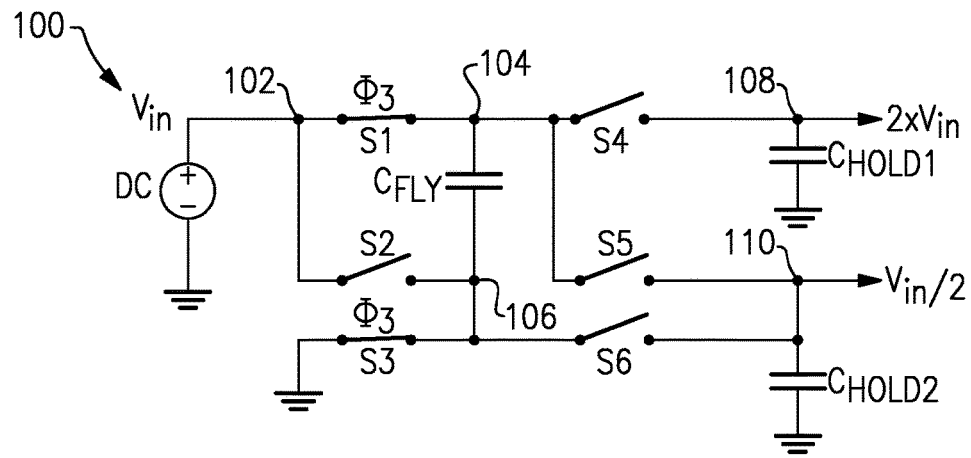

In the third phase ($\Phi_3$) example of FIG. 5C, the closed switches S1 and S3 are indicated by $\Phi_3$, and the remaining switches are in open states. Such an arrangement of $C_{Fly}$ between the input node (102 in FIG. 4) and ground, as well as isolation of $C_{Hold1}$ and the first output node (108) (for $2 \times V_{in}$), can result in a configuration similar to the first phase of the example of FIG. 3A (in which $C_{Fly}$ is arranged to be between the input node and ground through S1 and S4, and the output node is isolated by S3 being open).

Figure 5D:
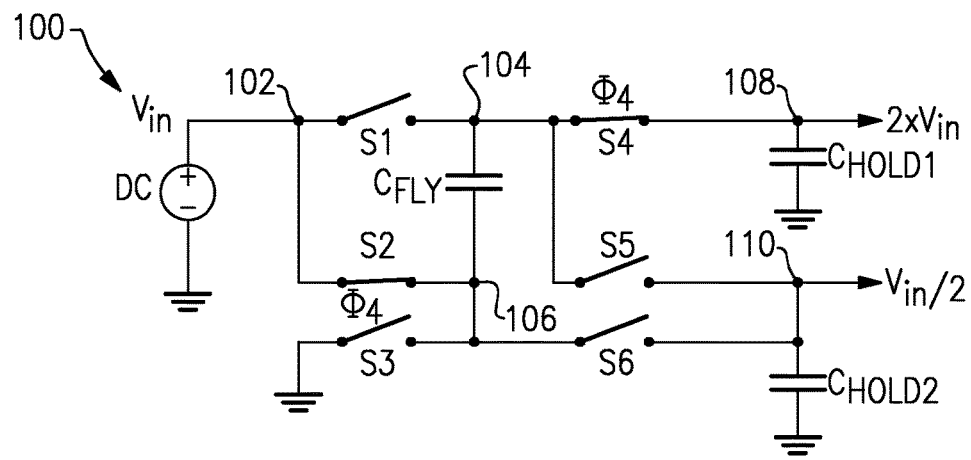

In the fourth phase ($\Phi_4$) example of FIG. 5D, the closed switches S2 and S4 are indicated by $\Phi_4$, and the remaining switches are in open states. Such an arrangement of $C_{Fly}$ between the input node (102 in FIG. 4) and the first output node (108) (for $2 \times V_{in}$) can result in a configuration similar to the second phase of the example of FIG. 3A (in which $C_{Fly}$ is arranged to be between the input node and the output node through S2 and S3).

In the example of FIGS. 5A-5D, the foregoing four-phase cycle can repeat to maintain both outputs for $2 \times V_{in}$ and $V_{in}/2$.

In the example charge pump circuit 100 of FIGS. 4 and 5A-5D, a number of circuit elements that are generally common to the charge pump doubler circuit (e.g., FIG. 3A) and the charge pump divider (e.g., FIG. 3B) can be combined so as to avoid duplications in the circuit 100. Such a combination of common circuit elements can yield an interleaved configuration of circuits that provide both voltage-doubling and voltage-halving functionalities with a reduced overall number of circuit elements.

For example, in the separate charge pump doubler and divider circuits of FIGS. 3A and 3B, each circuit includes four switches, one $C_{Fly}$ capacitor, and one $C_{Hold}$ capacitor. Accordingly, there are eight switches, two $C_{Fly}$ capacitors, and two $C_{Hold}$ capacitors for providing both voltage-doubling and voltage-halving functionalities. In the example configuration of FIGS. 4 and 5A-5D, however, there are six switches, one $C_{Fly}$ capacitor, and two $C_{Hold}$ capacitors for providing both voltage-doubling and voltage-halving functionalities. Thus, one can see that removal of two switches and one $C_{Fly}$ capacitor can be realized while providing similar voltage conversion functionalities. It is noted that $C_{Fly}$ capacitors typically have large capacitance values; accordingly, elimination of even one of such devices can be beneficial (e.g., in terms of a reduced BOM cost).

In the example of FIGS. 5A-5D, inefficient charge cycling can occur. FIG. 6 shows charge levels in the flying capacitor at the four phases for two example cycles. One can see that at transition of the flying capacitor between the $V_{in}/2$ and $2 \times V_{in}$ modes significant charge loss can occur (e.g., the transition between $\Phi_2$ and $\Phi_3$). More particularly, when one considers a relatively high load $V_{in}/2$ mode operating condition and a relatively light load $2 \times V_{in}$ mode operating condition, a large amount of charge added in Phase 3 is not fully transferred in Phase 4; and loss is then introduced in Phase 1 when the extra charge is not consumed by the load.

FIG. 7 shows charge levels in which the foregoing charge loss can be reduced. Given that limited charge is needed for the fourth phase, $V_{in}/2$ charging can be done in the third phase rather than the full $V_{in}$ charging. Examples of how the charge pump circuit of FIG. 4 can be operated differently than the example of FIGS. 5A-5D are described herein.

Figure 8:
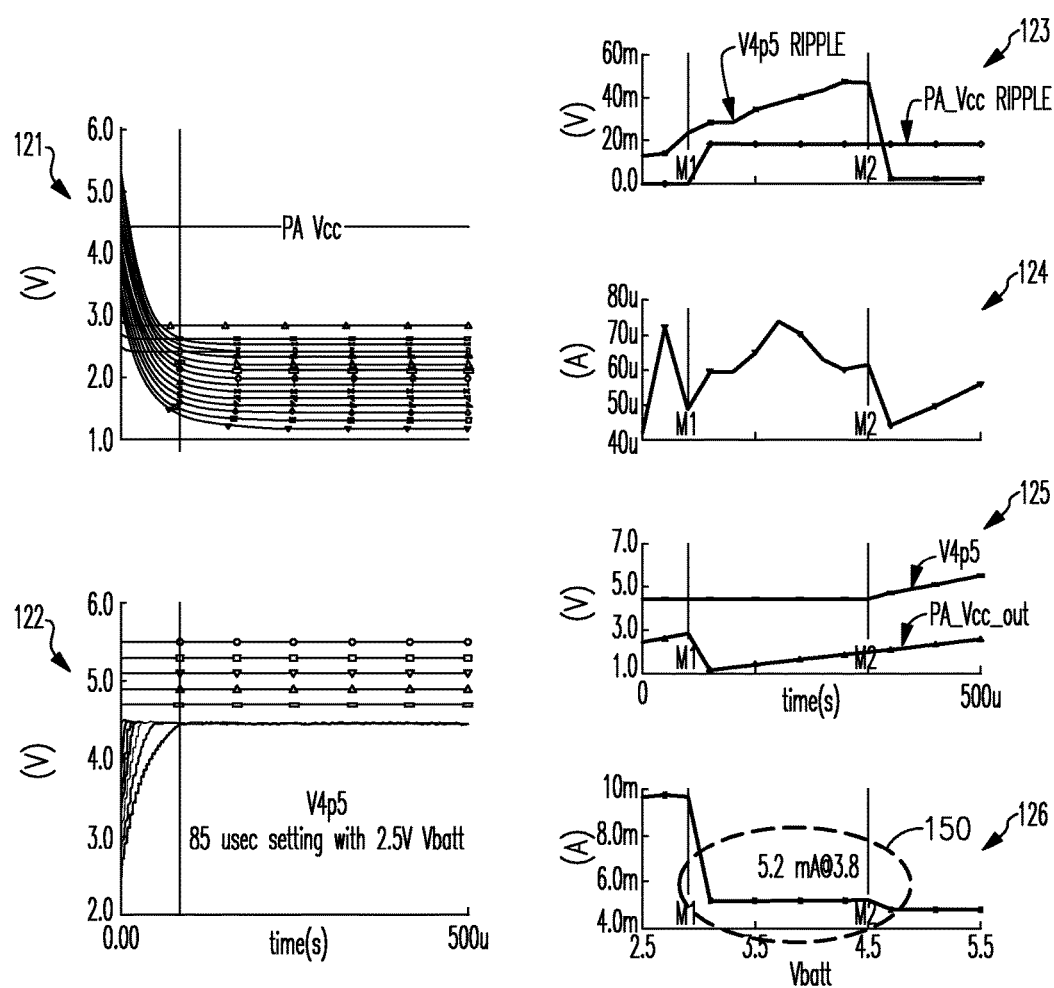
FIG. 8 shows example performance plots for the separate charge pump circuits of FIGS. 3A and 3B according to some implementations.

FIG. 8 shows example performance plots for the separate charge pump circuits of FIGS. 3A and 3B. Plots 121 and 122 show voltage versus time as $V_{in}$ (e.g., $V_{batt}$) is stepped from 2.5 V to 5.5 V at 200 mV increments. As shown by plots 121 and 122 there is an approximately 85 μs settling time. Plot 123 shows voltage versus time for PA_Vcc ripple and V4p5 ripple. Plot 124 shows the clock current versus time from 4.5 V. Plot 125 shows voltage versus time for V4p5 and PA_Vcc_out. Plot 126 shows current versus voltage.

Figure 9:
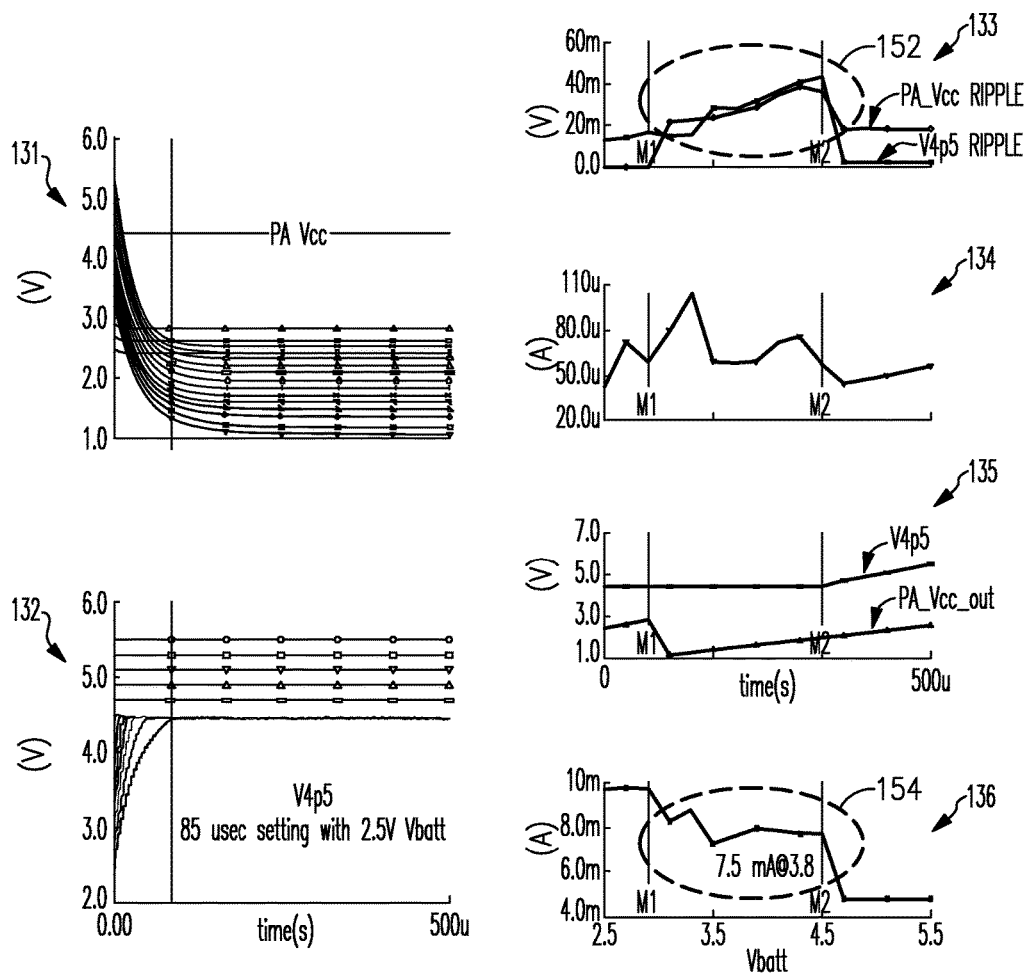
FIG. 9 shows example performance plots for the dual output charge pump circuit as operated in FIGS. 5A-5D according to some implementations.

FIG. 9 shows similar example performance plots for the charge pump circuit as operated in FIGS. 5A-5D. Plots 131 and 132 show voltage versus time as $V_{in}$ (e.g., $V_{batt}$) is stepped from 2.5 V to 5.5 V at 200 mV increments. As shown by plots 131 and 132 there is an approximately 85 μs settling time. Plot 133 shows voltage versus time for PA_Vcc ripple and V4p5 ripple. Plot 134 shows the clock current versus time from 4.5 V. Plot 135 shows voltage versus time for V4p5 and PA_Vcc_out. Plot 136 shows current versus voltage.

For comparison, and referring to a region indicated as 150 in FIG. 8, it is noted that there is an approximately 5.2 mA current drain in the separate charge pump circuits of FIGS. 3A and 3B. Referring to FIG. 9, in a region indicated as 154, there can be an increased current drain (e.g., approximately 7.5 mA) for the charge pump circuit of FIGS. 5A-5D. It is also noted that as shown in a region 152 of FIG. 9, the charge pump circuit of FIGS. 5A-5D can have an increased ripple compared to the separate charge pump circuits of FIGS. 3A and 3B.

In some embodiments, the charge pump circuit 100 of FIG. 4 can be operated differently than the example of FIGS. 5A-5D to address, for example, the foregoing current drain and ripple effects, as wells as the charge loss effect described in reference to FIGS. 6 and 7. FIGS. 10A-10D show a sequence of four phases that can be implemented to improve charge preservation. Table 3 lists switch configurations for each of the four phases.

TABLE 3

| Phase | S1 | S2 | S3 | S4 | S5 | S6 |
|---|---|---|---|---|---|---|
| $\Phi_1$ | Closed | Open | Open | Open | Open | Closed |
| $\Phi_2$ | Open | Open | Closed | Open | Closed | Open |
| $\Phi_3$ | Closed | Open | Open | Open | Open | Closed |
| $\Phi_4$ | Open | Closed | Open | Closed | Open | Open |

Figure 10A:
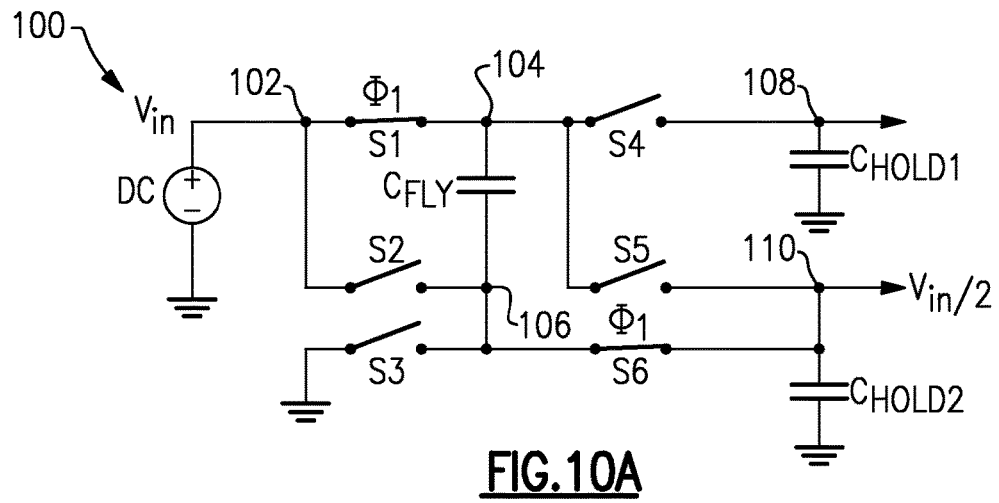
FIGS. 10A-10D show a sequence of four phases of operation of the dual output charge pump circuit in FIG. 4 that can be implemented to improve charge preservation according to some implementations.

In the first phase ($\Phi_1$) example of FIG. 10A, the closed switches S1 and S6 are indicated by $\Phi_1$, and the remaining switches are in open states. Such coupling of the input node (102 in FIG. 4) to the second output node (110) (for $V_{in}/2$) through S1, $C_{Fly}$ and S6 can result in a configuration similar to the first phase of the example of FIG. 3B (in which the input is coupled to the $V_{in}/2$ output through S1, $C_{Fly}$ and S4).

Figure 10B:
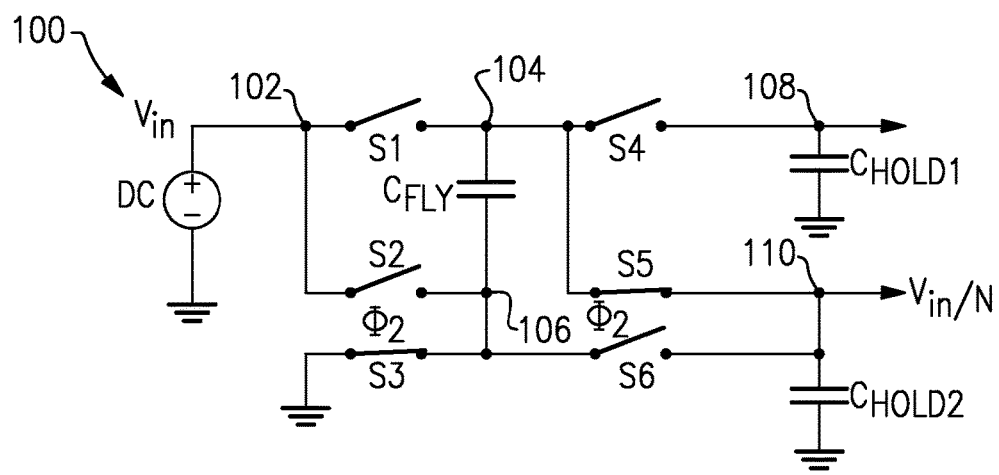

In the second phase ($\Phi_2$) example of FIG. 10B, the closed switches S3 and S5 are indicated by $\Phi_2$, and the remaining switches are in open states. Such an arrangement of $C_{Fly}$ and $C_{Hold2}$ with respect to ground and the second output node (110) (for $V_{in}/2$) through S3 and S5 can result in a configuration similar to the second phase of the example of FIG. 3B (in which $C_{Fly}$ and $C_{Hold2}$ are arranged similarly through S2 and S3).

Figure 10C:
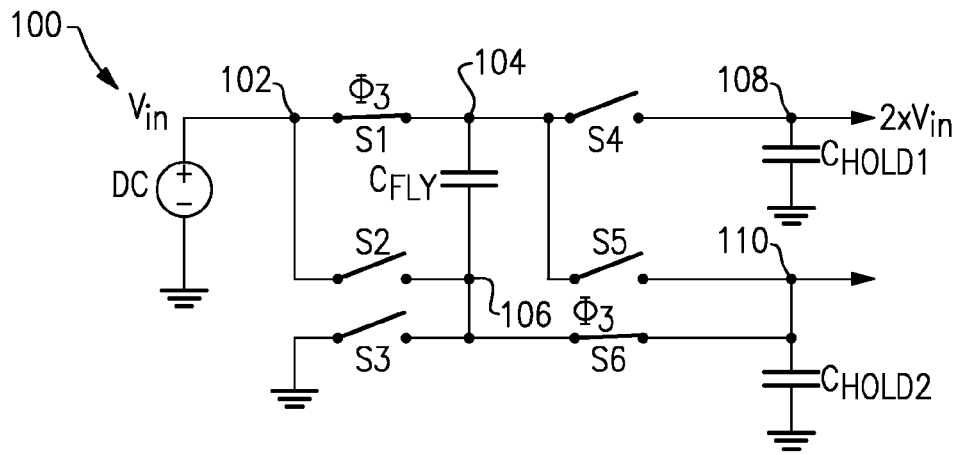

In the third phase ($\Phi_3$) example of FIG. 10C, the closed switches S1 and S6 are indicated by $\Phi_3$, and the remaining switches are in open states. Such a repeat arrangement of $C_{Fly}$ as in the first phase ($\Phi_1$) can result in $C_{Fly}$ being charged to $V_{in}/2$ instead of full $V_{in}$, similar to the example shown in FIG. 7.

Figure 10D:
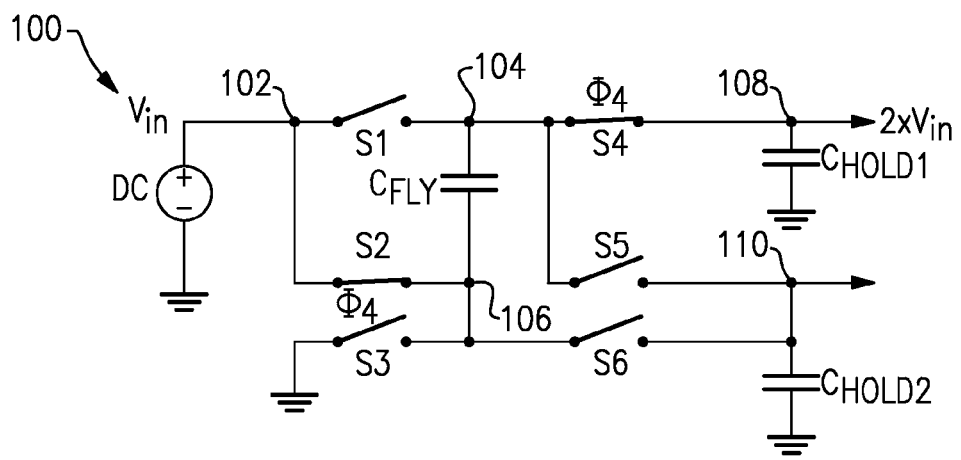

In the fourth phase ($\Phi_4$) example of FIG. 10D, the closed switches S2 and S4 are indicated by $\Phi_4$, and the remaining switches are in open states. Such an arrangement of can result in the first output node (108) (for $2 \times V_{in}$) being charged to yield the $2 \times V_{in}$ output.

In the example of FIGS. 10A-10D, the foregoing four-phase cycle can repeat to maintain both outputs for $2 \times V_{in}$ and $V_{in}/2$.

Figure 11:
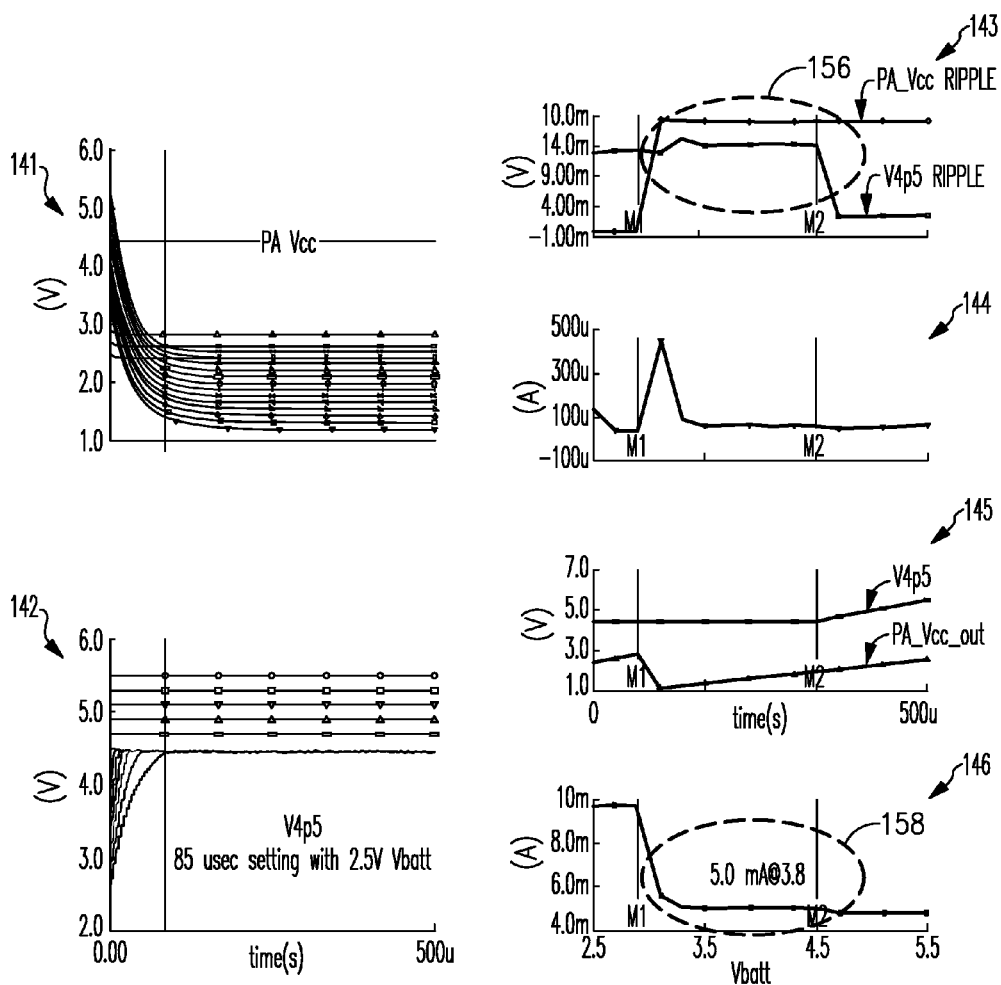
FIG. 11 shows example performance plots for the dual output charge pump circuit as operated in FIGS. 10A-10D according to some implementations.
Figure 12A:
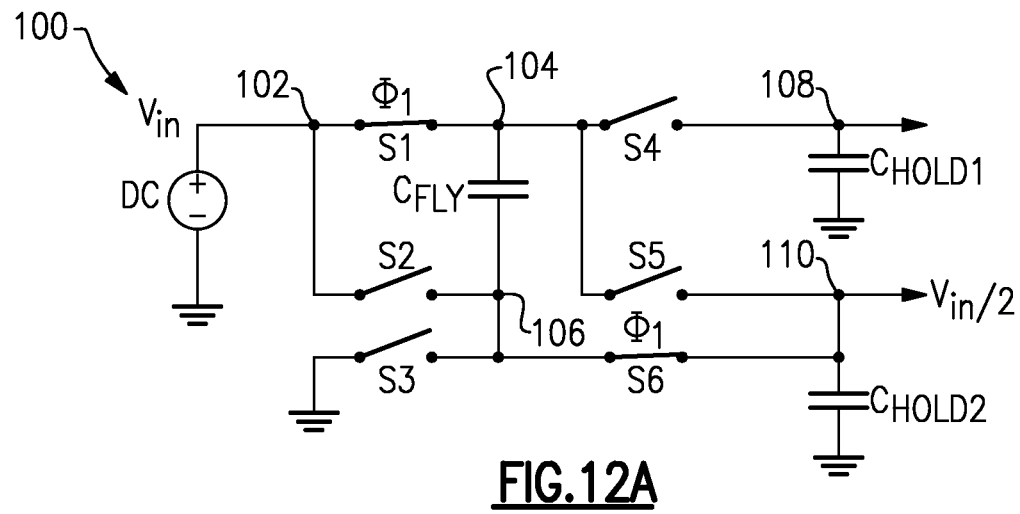
FIGS. 12A-12D show a sequence of four phases of operation of the dual output charge pump circuit in FIG. 4 that can be implemented to facilitate selective operation of the fourth phase according to some implementations.
Figure 12B:
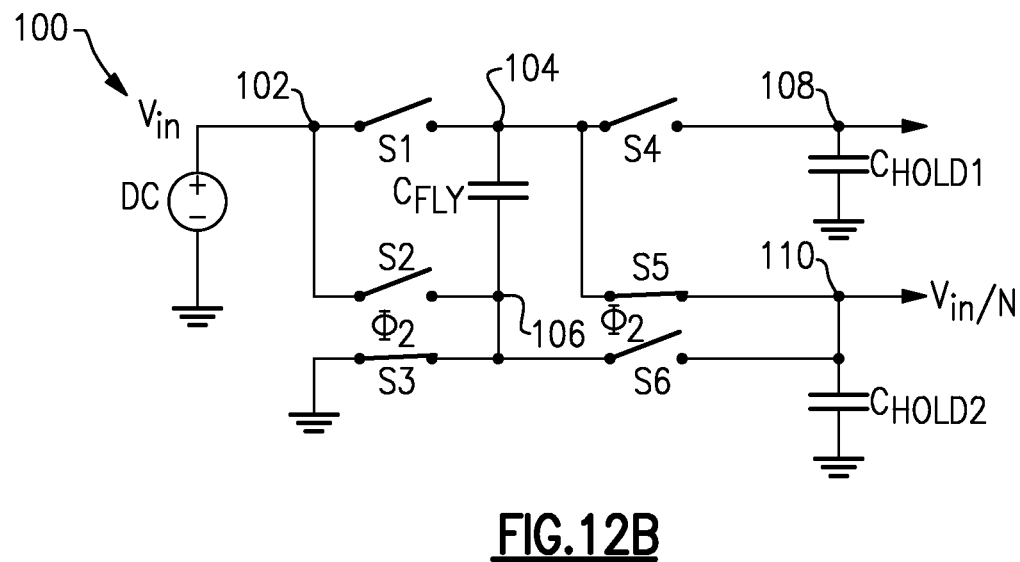
Figure 12C:
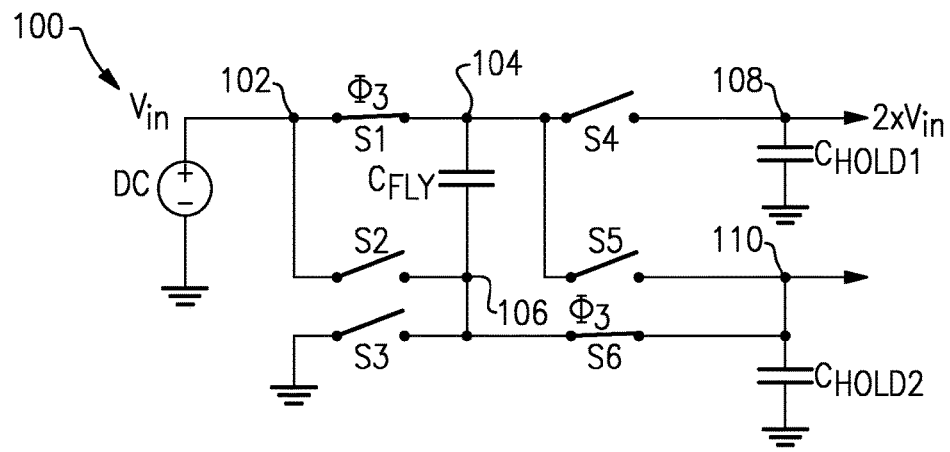
Figure 12D:
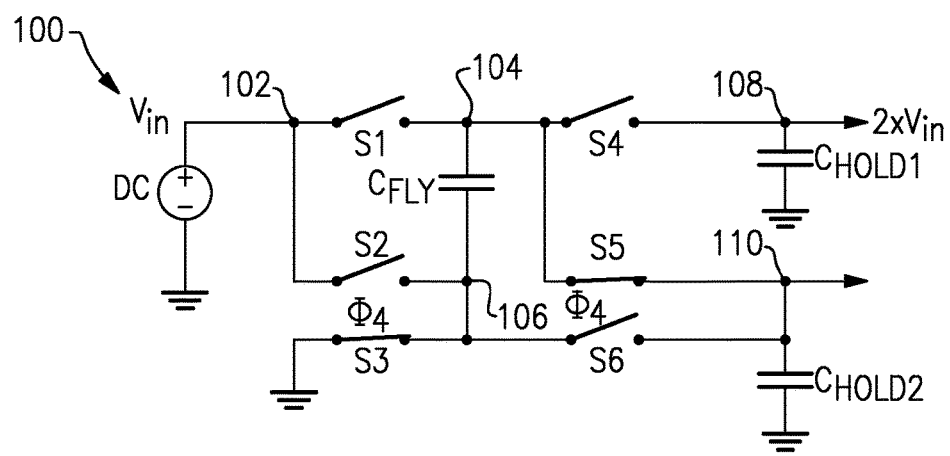

FIG. 11 shows example of performance plots for the charge pump circuit as operated in FIGS. 10A-10D. Plots 141 and 142 show voltage versus time as $V_{in}$ (e.g., $V_{batt}$) is stepped from 2.5 V to 5.5 V at 200 mV increments. As shown by plots 141 and 142 there is an approximately 85 μs settling time. Plot 143 shows voltage versus time for PA_Vcc ripple and V4p5 ripple. Plot 144 shows the clock current versus time from 4.5 V. Plot 145 shows voltage versus time for V4p5 and PA_Vcc_out. Plot 146 shows current versus voltage. Referring to a region indicated as 158, it is noted that the current drain level is back to approximately the level associated with the separate charge pump circuits of FIGS. 3A and 3B. Referring to a region indicated as 156, one can also see that the charge pump circuit of FIGS. 10A-10D yields a significantly improved ripple performance.

In some situations, it may be desirable to have the high side rail maintain, for example, a substantially fixed 4.5V output until the input voltage exceeds 4.5V. In some embodiments, use of a hysteretic feedback on the high side rail can control such an output voltage. By way of an example, Phase 4 can be executed if the doubler output rail falls below 4.5V. Due to the light load on the doubler output rail, not all charge from Phase 3 may be needed in Phase 4 to increase the rail above the 4.5V target.

It is noted that executing a complete Phase 4 cycle can introduce significant ripple. Phase 4 can be split such that the high side rail only charges up to the threshold voltage, then reverts back to the Phase 2 configuration to further charge the divide-by-2 low rail.

In some embodiments, the charge pump circuit 100 of FIG. 4 can be operated as shown in an example of FIGS. 12A-12D to facilitate the foregoing selective operation of Phase 4. Table 4 lists switch configurations for each of the four phases.

TABLE 4

| Phase | S1 | S2 | S3 | S4 | S5 | S6 |
|---|---|---|---|---|---|---|
| $\Phi_1$ | Closed | Open | Open | Open | Open | Closed |
| $\Phi_2$ | Open | Open | Closed | Open | Closed | Open |
| $\Phi_3$ | Closed | Open | Open | Open | Open | Closed |
| $\Phi_4$ | Open | Open | Closed | Open | Closed | Open |

In the example of FIGS. 12A-12D, the first three phases ($\Phi_1$, $\Phi_2$, $\Phi_3$) can be operated similar to the example of FIGS. 10A-10C. In the fourth phase ($\Phi_4$) example of FIG. 12D, the closed switches S3 and S5 are indicated by $\Phi_4$, and the remaining switches are in open states. Such an arrangement of can facilitate the foregoing selective operation of the fourth phase ($\Phi_4$).

In the example of FIGS. 12A-12D, the foregoing four-phase cycle can repeat to maintain both outputs for $2 \times V_{in}$ and $V_{in}/2$.

Figure 13:
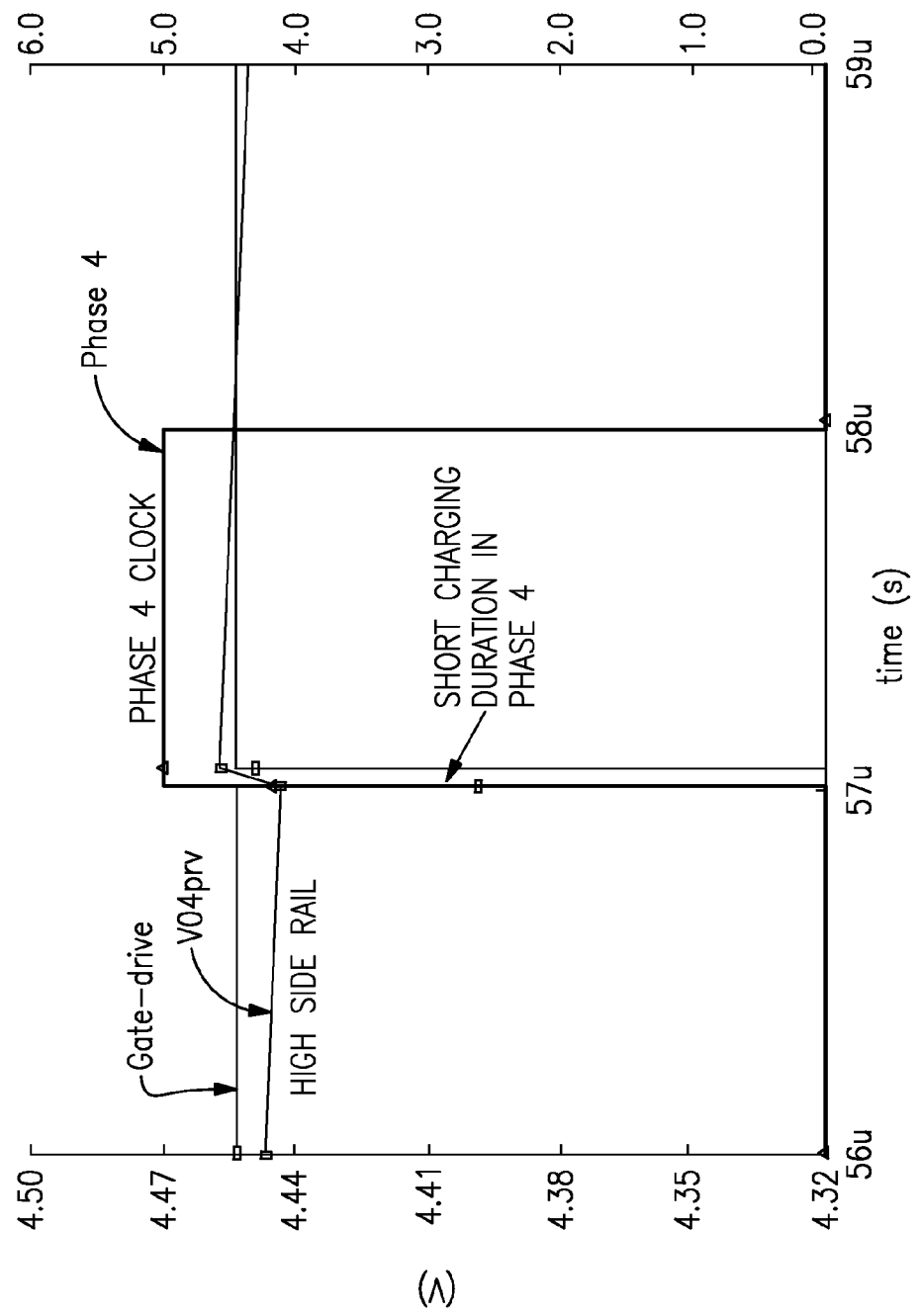
FIG. 13 shows an example of a timing diagram that can be implemented in the example of FIGS. 12A-12D according to some implementations.

FIG. 13 shows an example of a timing diagram that can be implemented in the example of FIGS. 12A-12D. In the timing diagram of FIG. 12, Phase 4 can be truncated so as to limit ripple effects in the foregoing hysteretic feedback.

Figure 14:
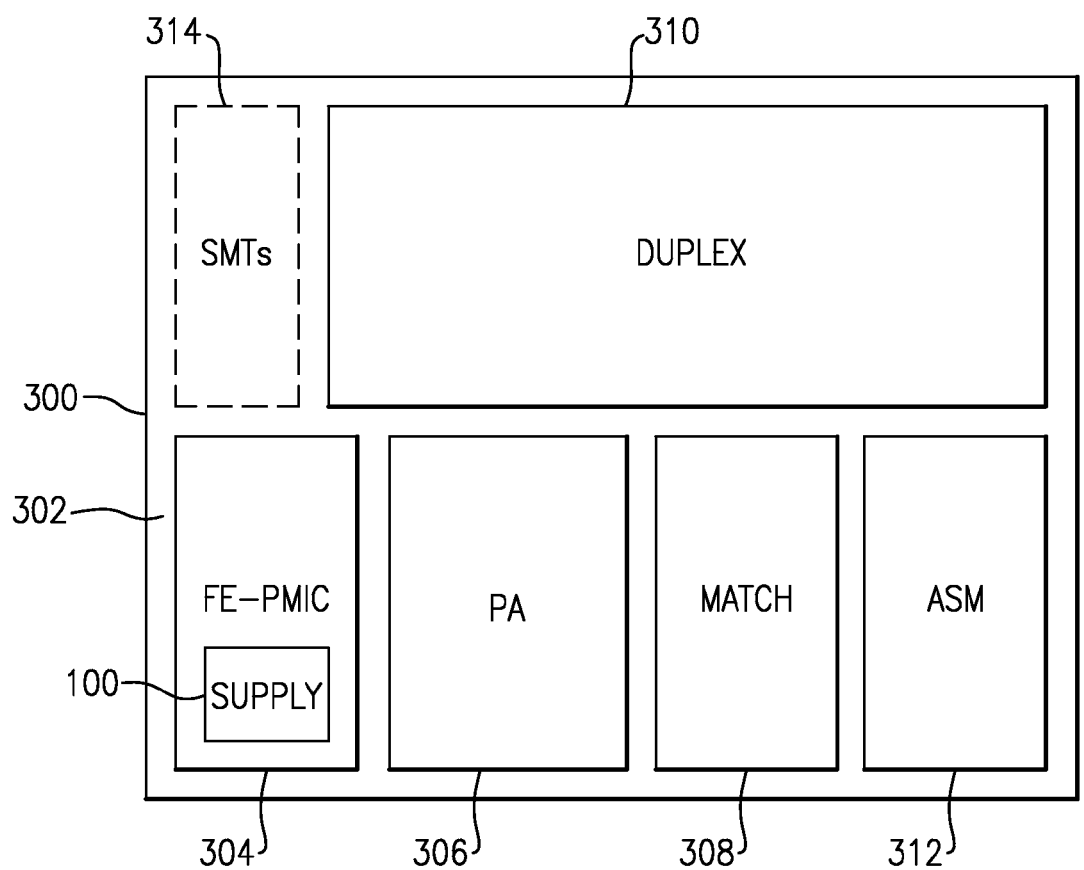
FIG. 14 is a schematic diagram of an example module according to some implementations.

FIG. 14 shows that in some embodiments, some or all of the voltage supply circuit having one or more features as described herein (e.g., 100 in FIGS. 4, 5A-5D, 10A-10D, and 12A-12D) can be implemented in a module. Such a module can be, for example, a front-end module (FEM). In the example of FIG. 14, a radio frequency (RF) module 300 can include a packaging substrate 302, and a number of components can be mounted on such a packaging substrate. For example, a front-end power management integrated circuit (FE-PMIC) component 304, a power amplifier assembly 306, a match component 308, and a duplexer assembly 310 can be mounted and/or implemented on and/or within the packaging substrate 302. Other components such as a number of surface mount technology (SMT) devices 314 and an antenna switch module (ASM) 312 can also be mounted on the packaging substrate 302. Although all of the various components are depicted as being laid out on the packaging substrate 302, it will be understood that some component(s) can be implemented over other component(s). In some embodiments, a voltage supply circuit 100 having one or more features as described herein can be implemented as a part of the FE-PM IC component 304.

In some implementations, a device and/or a circuit having one or more features described herein can be included in an RF device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 15:
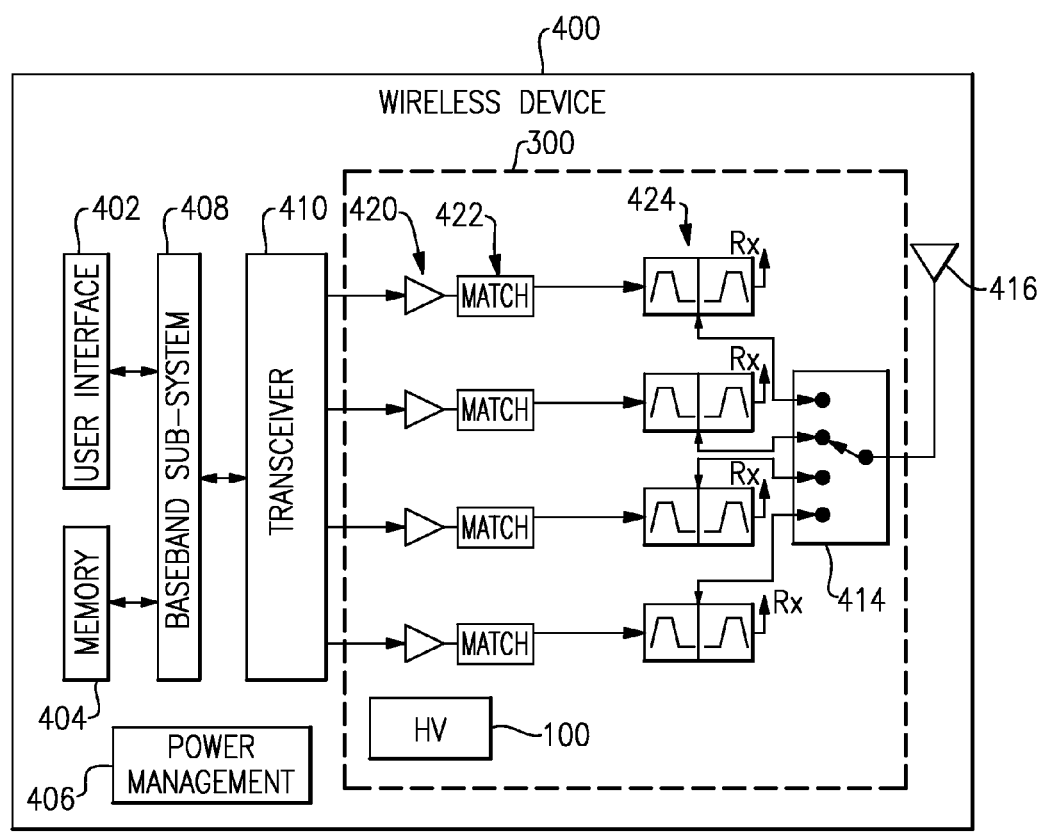
FIG. 15 is a schematic diagram of an example wireless device according to some implementations.

FIG. 15 depicts an example wireless device 400 having one or more advantageous features described herein. In the context of a module having one or more features as described herein, such a module can be generally depicted by a dashed box 300, and can be implemented as, for example, a front-end module (FEM).

Referring to FIG. 15, power amplifiers (PAs) 420 can receive their respective RF signals from a transceiver 410 that can be configured and operated in known manners to generate RF signals to be amplified and transmitted, and to process received signals. The transceiver 410 is shown to interact with a baseband sub-system 408 that is configured to provide conversion between data and/or voice signals suitable for a user and RF signals suitable for the transceiver 410. The transceiver 410 can also be in communication with a power management component 406 that is configured to manage power for the operation of the wireless device 400. Such power management can also control operations of the baseband sub-system 408 and the module 300.

The baseband sub-system 408 is shown to be connected to a user interface 402 to facilitate various input and output of voice and/or data provided to and received from the user. The baseband sub-system 408 can also be connected to a memory 404 that is configured to store data and/or instructions to facilitate the operation of the wireless device, and/or to provide storage of information for the user.

In the example wireless device 400, outputs of the PAs 420 are shown to be matched (via respective match circuits 422) and routed to their respective duplexers 424. Such amplified and filtered signals can be routed to an antenna 416 through an antenna switch 414 for transmission. In some embodiments, the duplexers 424 can allow transmit and receive operations to be performed simultaneously using a common antenna (e.g., 416). In FIG. 15, received signals are shown to be routed to "Rx" paths (not shown) that can include, for example, a low-noise amplifier (LNA).

In some embodiments, a voltage supply circuit such as a dual output supply system 100 as described herein can be implemented as a part of the module 300.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A charge pump comprising a boost charge pump circuit including an input node and a boosted-voltage output node, and a buck charge pump circuit including the input node and a divided-voltage output node sharing a common flying capacitance, the common flying capacitance configured to be partially charged to less than an input voltage during a phase of output voltage generation and configured to undergo truncated charging to limit a ripple effect in a hysteretic feedback loop, the boost charge pump circuit including a first holding capacitance that couples the boosted-voltage output node to a ground, the boost charge pump circuit and the buck charge pump circuit each including a plurality of switches implemented to incorporate the common flying capacitance and generate output voltages having magnitudes 2×Vbatt and Vbatt/2 respectively.

2. The charge pump of claim 1 wherein said plurality of switches includes a first switch (S1) and a second switch (S2) arranged in parallel between the input node and respective ends of the flying capacitance.

3. The charge pump of claim 2 wherein said plurality of switches includes a third switch (S3) between the second end of the flying capacitance and the ground.

4. The charge pump of claim 3 wherein said plurality of switches includes a fourth switch (S4) between the first end of the flying capacitance and the boosted-voltage output node.

5. The charge pump of claim 4 wherein said plurality of switches includes a fifth switch (S5) between the first end of the flying capacitance and the divided-voltage output node.

6. The charge pump of claim 1 wherein the buck pump circuit further includes a second holding capacitance that couples the divided-voltage output node to the ground.

7. The charge pump of claim 5 wherein said plurality of switches includes a sixth switch (S6) between the second end of the flying capacitance and the divided-voltage output node.

8. The charge pump of claim 7 wherein the switches S1, S2, S3, S4, S5 and S6 are configured to operate in four phases to yield the output voltages having magnitudes 2×Vbatt and Vbatt/2.

9. The charge pump of claim 8 wherein the first phase includes closed S1 and S6 and open S2 to S5, the second phase includes closed S3 and S5 and open S1, S2, S4 and S6, the third phase includes closed S1 and S3 and open S2 and S4 to S6, and the fourth phase includes closed S2 and S4 and open S1, S3, S5 and S6.

10. The charge pump of claim 8 wherein the first phase includes closed S1 and S6 and open S2 to S5, the second phase includes closed S3 and S5 and open S1, S2, S4 and S6, the third phase includes closed S1 and S6 and open S2 to S5, and the fourth phase includes closed S2 and S4 and open S1, S3, S5 and S6.

11. The charge pump of claim 10 wherein the third phase includes partial charging of the flying capacitance to improve charge preservation.

12. The charge pump of claim 8 wherein the first phase includes closed S1 and S6 and open S2 to S5, the second phase includes closed S3 and S5 and open S1, S2, S4 and S6, the third phase includes closed S1 and S6 and open S2 to S5, and the fourth phase includes closed S3 and S5 and open S1, S2, S4 and S6.

13. The charge pump of claim 12 wherein the fourth phase includes truncated charging of the flying capacitance to limit ripple effect in hysteretic feedback loop.

14. A voltage supply system comprising:
a boost converter configured to generate a boosted voltage based on a battery voltage Vbatt; and
a charge pump having a boost charge pump circuit including an input node and a boosted-voltage output node, and a buck charge pump circuit including the input node and a divided-voltage output node sharing a common flying capacitance, the common flying capacitance configured to be partially charged to less than an input voltage during a phase of output voltage generation and configured to undergo truncated charging to limit ripple effect in a hysteretic feedback loop, the boost charge pump circuit including a first holding capacitance that couples the boosted-voltage output node to a ground, the boost charge pump circuit and the buck charge pump circuit each including a plurality of switches implemented to incorporate the common flying capacitance and generate output voltages having magnitudes 2×Vbatt and Vbatt/2 respectively.

15. The voltage supply system of claim 14 wherein the buck pump circuit further includes a second holding capacitance that couples the divided-voltage output node to the ground.

16. The voltage supply system of claim 15 wherein said plurality of switches includes a first switch (S1) and a second switch (S2) arranged in parallel between the input node and respective ends of the flying capacitance, a third switch (S3) between the second end of the flying capacitance and the ground, a fourth switch (S4) between the first end of the flying capacitance and the boosted-voltage output node, a fifth switch (S5) between the first end of the flying capacitance and the divided-voltage output node, and a sixth switch (S6) second end of the flying capacitance and the divided-voltage output node.

17. The voltage supply system of claim 16 wherein switches S1, S2, S3, S4, S5 and S6 are configured to operate in four phases to yield the output voltages having magnitudes 2×Vbatt and Vbatt/2.

18. A radio-frequency (RF) module comprising:
a packaging substrate configured to receive a plurality of components; and
a power amplification system implemented on the packaging substrate, the power amplification system including a voltage supply system, the voltage supply system including a charge pump having a boost charge pump circuit including an input node and a boosted-voltage output node, and a buck charge pump circuit including the input node and a divided-voltage output node sharing a common flying capacitance, the common flying capacitance configured to be partially charged to less than an input voltage during a phase of output voltage generation and configured to undergo truncated charging to limit ripple effect in a hysteretic feedback loop, the boost charge pump circuit including a first holding capacitance that couples the boosted-voltage output node to a ground, the boost charge pump circuit and the buck charge pump circuit each including a plurality of switches implemented to incorporate the common flying capacitance and generate output voltages having magnitudes 2×Vbatt and Vbatt/2 respectively.

19. The RF module of claim 18 wherein;
the buck pump circuit further includes a second holding capacitance that couples the divided-voltage output node to the ground.

20. The RF module of claim 19 wherein said plurality of switches includes a first switch (S1) and a second switch (S2) arranged in parallel between the input node and respective ends of the flying capacitance, a third switch (S3) between the second end of the flying capacitance and the ground, a fourth switch (S4) between the first end of the flying capacitance and the boosted-voltage output node, a fifth switch (S5) between the first end of the flying capacitance and the divided-voltage output node, and a sixth switch (S6) between the second end of the flying capacitance and the divided-voltage output node.

* * * * *